(12) United States Patent
Vaquero Gomez et al.

(10) Patent No.: US 11,328,517 B2
(45) Date of Patent: May 10, 2022

(54) SYSTEM AND METHOD FOR GENERATING FEATURE SPACE DATA

(71) Applicant: Toyota Research Institute, Inc., Los Altos, CA (US)

(72) Inventors: Victor Vaquero Gomez, Colmenar Viejo (ES); Rares A. Ambrus, San Francisco, CA (US); Vitor Guizilini, Santa Clara, CA (US); Adrien David Gaidon, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 71 days.

(21) Appl. No.: 16/879,024

(22) Filed: May 20, 2020

(65) Prior Publication Data

US 2021/0365697 A1 Nov. 25, 2021

(51) Int. Cl.
*G06K 9/00* (2006.01)
*G06V 20/58* (2022.01)
(Continued)

(52) U.S. Cl.
CPC .............. *G06V 20/58* (2022.01); *G01S 17/89* (2013.01); *G06N 3/0454* (2013.01); *G06N 3/08* (2013.01);
(Continued)

(58) Field of Classification Search
CPC ........... G06K 9/00805; G06K 9/00664; G06N 3/0454; G06N 3/08; G01S 17/89; G06T 17/00; G06T 7/521; G06T 2207/30252; G06T 2207/20084; G06T 2207/10028; G06T 2207/20081
See application file for complete search history.

(56) References Cited

U.S. PATENT DOCUMENTS

2019/0371052 A1 12/2019 Kehl et al.
2020/0160559 A1* 5/2020 Urtasun ................. G06K 9/629

FOREIGN PATENT DOCUMENTS

EP 2891899 A1 7/2015

OTHER PUBLICATIONS

Wang et al., Pseudo-LiDAR from Visual Depth Estimation: Bridging the Gap in 3D Object Detection for Autonomous Driving, arXiv: 1812.07179v6 (Feb. 22, 2020).*

(Continued)

*Primary Examiner* — Ping Y Hsieh
*Assistant Examiner* — Xiao Liu
(74) *Attorney, Agent, or Firm* — Christopher G. Darrow; Darrow Mustafa PC

(57) ABSTRACT

A system and method generate feature space data that may be used for object detection. The system includes one or more processors and a memory. The memory may include one or more modules having instructions that, when executed by the one or more processors, cause the one or more processors to obtain a two-dimension image of a scene, generate an output depth map based on the two-dimension image of the scene, generate a pseudo-LIDAR point cloud based on the output depth map, generate a bird's eye view (BEV) feature space based on the pseudo-LIDAR point cloud, and modify the BEV feature space to generate an improved BEV feature space using feature space neural network that was trained by using a training LIDAR feature space as a ground truth based on a LIDAR point cloud.

20 Claims, 6 Drawing Sheets

(51) Int. Cl.
  *G06T 17/00* (2006.01)
  *G06N 3/08* (2006.01)
  *G06N 3/04* (2006.01)
  *G01S 17/89* (2020.01)
  *G06T 7/521* (2017.01)
  *G06V 20/10* (2022.01)

(52) U.S. Cl.
  CPC .............. *G06T 7/521* (2017.01); *G06T 17/00* (2013.01); *G06V 20/10* (2022.01); *G06T 2207/10028* (2013.01); *G06T 2207/20081* (2013.01); *G06T 2207/20084* (2013.01); *G06T 2207/30252* (2013.01)

(56) References Cited

OTHER PUBLICATIONS

Wang et al., "Pseudo-LiDar from Visual Depth Estimation: Bridging the Gap in 3D Object Detection for Autonomous Driving," 2019 IEEE/CVF Conference on Computer Vision and Pattern Recognition (CVPR), p. 8445-8453 (2019).

Weng et al., "Monocular 3D Object Detection with Pseudo-LiDAR Point Cloud," IEEE International Conference on Computer Vision, 10 pages (2019).

You et al., "Pseudo-LiDar++: Accurate Depth for 3D Object Detection in Autonomous Driving," 22 pages, arXiv: 1906.06310v3 [cs.CV] Feb. 15, 2020.

Yang et al., "PIXOR: Real-time 3D Object Detection from Point Clouds," 10 pages, arXiv: 1902.06326v3 [cs.CV] Mar. 2, 2019.

\* cited by examiner

SYSTEM AND METHOD FOR GENERATING FEATURE SPACE DATA

TECHNICAL FIELD

The subject matter described herein relates, in general, to systems and methods for generating feature space data and, more specifically, systems and methods for generating feature space data based on two-dimensional images.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Various devices that operate autonomously or that provide information about a surrounding environment may use sensors that facilitate perceiving obstacles and additional aspects of the surrounding environment. For example, a robotic device uses information from the sensors to develop an awareness of the surrounding environment in order to navigate through the environment and avoid hazards. In particular, the robotic device uses the perceived information to determine a 3-D structure of the environment in order to identify navigable regions. The ability to perceive distances through estimation of depth using sensor data provides the robotic device with the ability to plan movements through the environment and generally improve situational awareness about the environment.

However, depending on the available onboard sensors, the robotic device may acquire a limited perspective of the environment, and, thus, can encounter difficulties in distinguishing aspects of the environment. Moreover, various sensors perceive different aspects of the environment differently and have different implementation characteristics. For example, light detection and ranging (LIDAR) is effective at perceiving depth in the surrounding environment but suffers from difficulties such as high costs and can encounter errors in certain weather conditions. Camera systems can provide detailed images, but these images are two dimensional.

SUMMARY

This section generally summarizes the disclosure and is not a comprehensive explanation of its full scope or all its features.

In one embodiment, a system for generating feature space data may include one or more processors and a memory in communication with the one or more processors. The memory may include an input module, a depth map generating module, a pseudo-LIDAR generating module, a feature space generating module, and a modification module. The input module may include instructions that, when executed by the one or more processors, causes the one or more processors to obtain a two-dimension image of a scene.

The depth map generating module may include instructions that, when executed by the one or more processors, causes the one or more processors to generate an output depth map based on the two-dimension image of the scene captured by a camera, such as an RGB camera. Based on the output depth map, the pseudo-LIDAR generating module may include instructions that, when executed by the one or more processors, causes the one or more processors to generate a pseudo-LIDAR point cloud.

The feature space generating module may include instructions that, when executed by the one or more processors, causes the one or more processors to generate a bird's eye view (BEV) feature space based on the pseudo-LIDAR point cloud or any other 3D point cloud such as the one generated by a LIDAR sensor. The BEV feature space may be a bird's eye view of the scene and having on more features. With regards to the modification module, the modification module may include instructions that, when executed by the one or more processors, causes the one or more processors to modify, by using a feature space neural network, the BEV feature space to generate an improved BEV feature space The feature space neural network may be trained by using a training LIDAR feature space based on a LIDAR point cloud as a ground truth and generated by the generating module.

In another embodiment, a method for generating feature space data includes the steps of obtaining a two-dimension image of a scene, generating an output depth map based on the two-dimension image of the scene, generating a pseudo-LIDAR point cloud based on the output depth map, generating a BEV feature space based on the pseudo-LIDAR point cloud, and modifying, by a feature space neural network, the BEV feature space to generate an improved BEV feature space. The feature space neural network may be trained by using a training LIDAR feature space based on a LIDAR point cloud as a ground truth.

In yet another embodiment, a non-transitory computer-readable medium storing instructions for generating feature space data that, when executed by one or more processors, cause the one or more processors to obtain a two-dimension image of a scene, generate an output depth map based on the two-dimension image of the scene, generate a pseudo-LIDAR point cloud based on the output depth map, generate a BEV feature space based on the pseudo-LIDAR point cloud, and modify, by a feature space neural network, the BEV feature space to generate an improved BEV feature space. Like before, the feature space neural network may be trained by using a training LIDAR feature space based on a LIDAR point cloud as a ground truth.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Described is a system and method for generating improved feature space data. Feature space data may function as input into an object detection system. Prior art methodologies would generate a feature space data by receiving data from a LIDAR detector in the form of a LIDAR point cloud and converting the LIDAR point cloud to feature space data. This may done by dividing the LIDAR point cloud into a plurality of voxels and assigning one or more values to each voxel based on the number of points located within each voxel.

Here, the system and method generates a pseudo-LIDAR point cloud based on a depth map that was generated utilizing one or more two-dimensional images as an input. The system and method are able to generate a bird's eye view (BEV) feature space based on the pseudo-LIDAR point cloud as input. Once the BEV feature space has been generated, a feature space neural network modifies the BEV feature space. The feature space neural network may be a convolutional neural network (CNN) or a generative adversarial network (GAN) that has been trained utilizing a training LIDAR feature space as the ground truth. The training LIDAR feature space may be based on an actual LIDAR point cloud generated from a LIDAR sensor, as opposed to a pseudo-LIDAR point cloud that originated with one or more two-dimensional images from a camera or similar sensor.

In effect, the feature space neural network is able to modify the BEV feature space to generate a modified BEV feature space that more closely resembles the feature space that originated with actual LIDAR point cloud data captured by a LIDAR sensor. As such, the system and method has the benefits of outputting a feature space originating from two-dimensional images similar to that of a feature space that originated actual LIDAR point cloud data captured by a LIDAR sensor, without the cost and complexities of utilizing LIDAR sensor.

Figure 1:
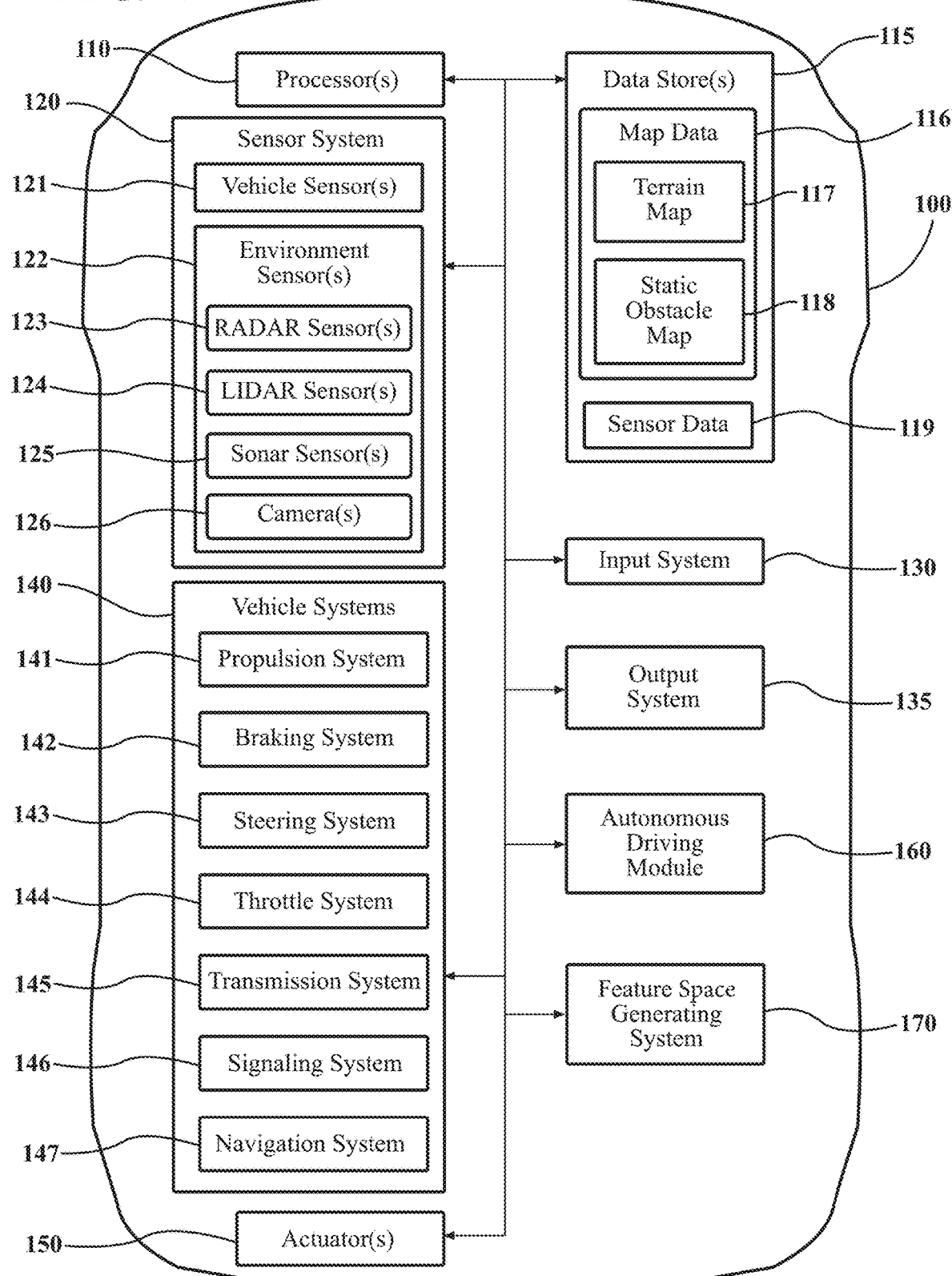
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, proceeds through an environment according to assessed aspects of the environment, and thus benefits from the functionality discussed herein. In yet further embodiments, the vehicle 100 may be a statically mounted device, an embedded device, or another device that uses two-dimensional images to generate feature space data about a scene.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), etc.).

Some of the possible elements of the vehicle 100 are shown in FIG. 1 and will be described along with subsequent figures. However, a description of many of the elements in FIG. 1 will be provided after the discussion of the other figures for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a feature space generating system 170 that functions to process two-dimensional images and generate feature space data based thereon. Moreover, while depicted as a standalone component, in one or more embodiments, the feature space generating system 170 is integrated with the autonomous driving module(s) 160, the camera 126, or another component of the vehicle 100. The noted functions and methods will become more apparent with a further discussion of the figures.

Figure 2:
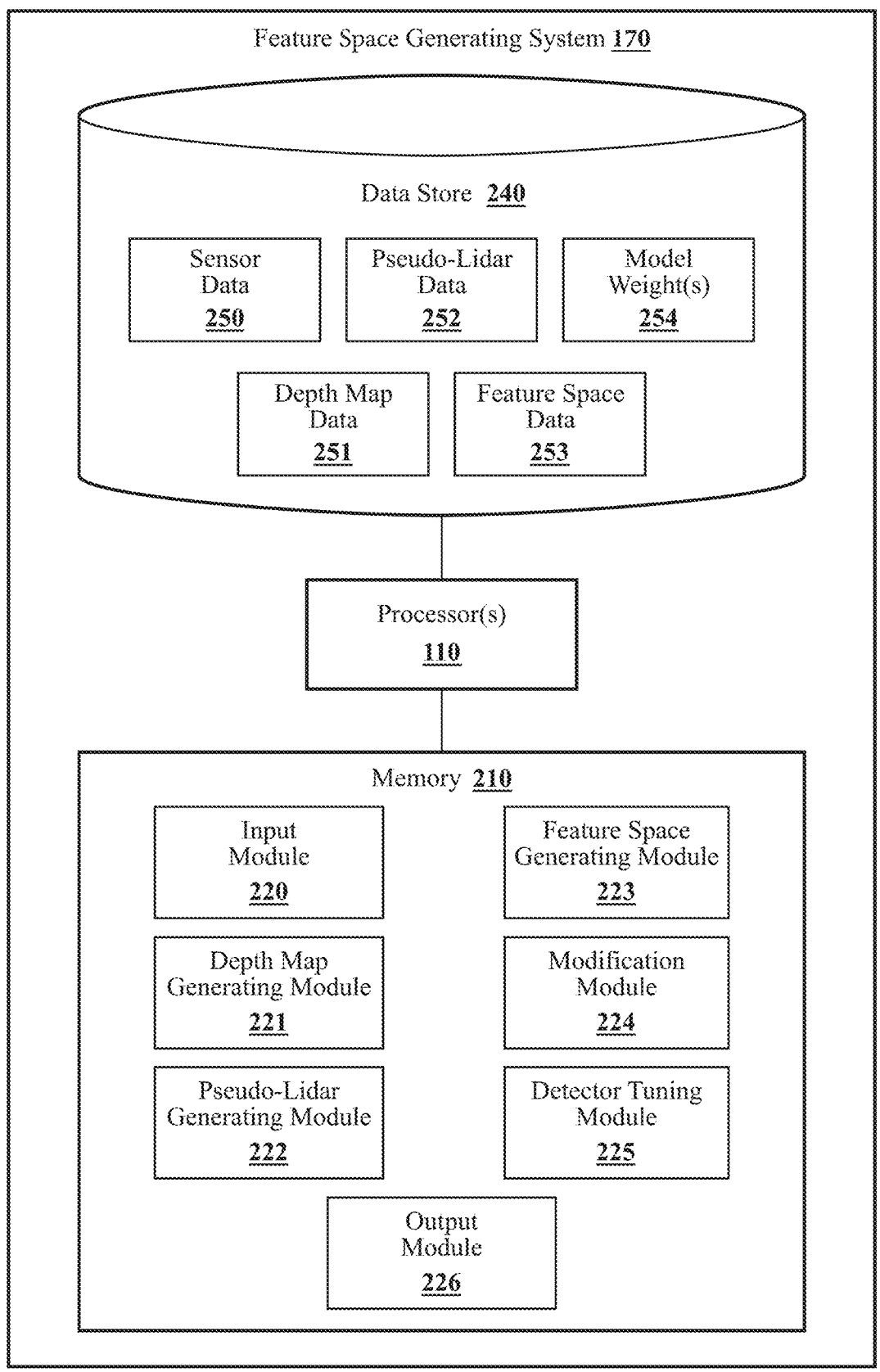
FIG. 2 illustrates one embodiment of a feature space data generating system that utilizes one or more two-dimensional images to generate the feature space.

With reference to FIG. 2, one embodiment of the feature space generating system 170 is further illustrated. The feature space generating system 170 is shown as including a processor(s) 110. Accordingly, the processor(s) 110 may be a part of the feature space generating system 170 or the feature space generating system 170 may access a processor(s) 110 through a data bus or another communication path. In one or more embodiments, the processor(s) 110 is an application-specific integrated circuit (ASIC) that is configured to implement functions associated with an input module 220, a depth map generating module 221, a pseudo-LIDAR generating module 222, a feature space generating module 223, a modification module 224, a detector tuning module 225, and/or an output module 226. In general, the processor(s) 110 is an electronic processor such as a microprocessor that is capable of performing various functions as described herein. In one embodiment, the feature space generating system 170 includes a memory 210 that stores the modules 220-226. The memory 210 is a random-access memory (RAM), read-only memory (ROM), a hard disk drive, a flash memory, or other suitable memory for storing the modules 220-226. The modules 220-226 are, for example, computer-readable instructions that when executed by the processor(s) 110 cause the processor(s) 110 to perform the various functions disclosed herein.

Furthermore, in one embodiment, the feature space generating system 170 includes a data store 240. The data store 240 is, in one embodiment, an electronic data structure stored in the memory 210 or another data store and that is configured with routines that can be executed by the processor(s) 110 for analyzing stored data, providing stored data, organizing stored data, and so on. Thus, in one embodiment, the data store 240 stores data used by the modules 220-226 in executing various functions. In one embodiment, the data store 240 includes sensor data 250, depth map data 251, pseudo-LIDAR data 252, feature space data 253, and/or one or more model weight(s) 254, along with, for example, other information that is used by the modules 220-226.

Moreover, the sensor data 250 may include one or more two-dimensional images captured by one or more sensors, such as the camera 126. With regards to the depth map data 251, as will be explained later, the depth map data 251 may be a representation of the depth of objects located within the sensor data 250. The pseudo-LIDAR data 252 may be point cloud data that is generated by the depth map data 251 to mimic a LIDAR point cloud. In this case, the difference being that the pseudo-LIDAR data 252 originated with one or more two-dimensional images, as opposed to actual LIDAR data collected by an actual LIDAR sensor. Feature space data 253 may be a feature space that is generated from the pseudo-LIDAR data 252 that is eventually provided to an object detection system that is able to determine the presence of one or more objects in the feature space data 253. As to the model weight(s) 254, these may be one or more weights utilized in a machine learning algorithm, such as a CNN or a GAN, which may be used perform any part of the modules 220-226.

Figure 3:
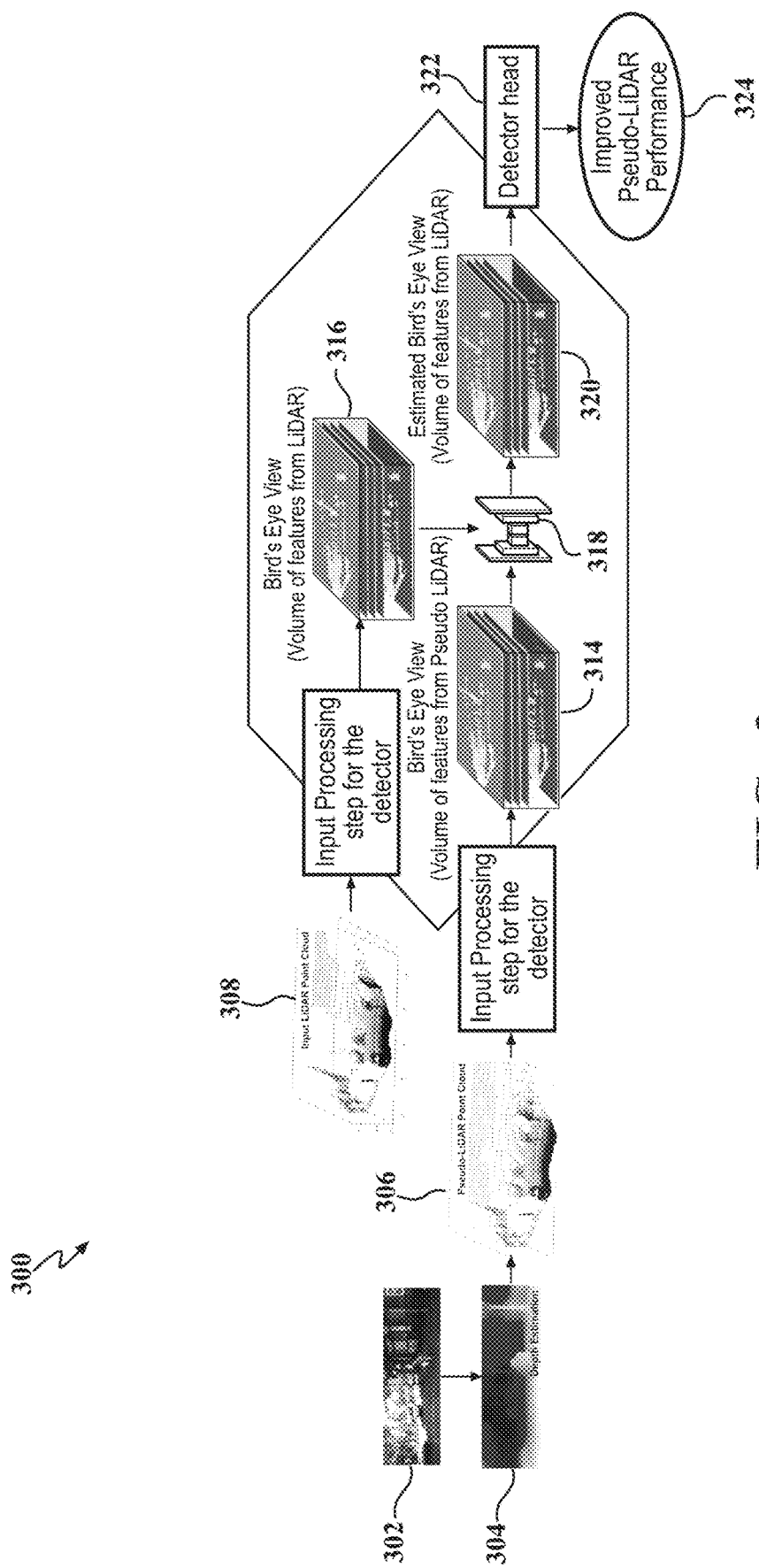
FIG. 3 illustrates one example of a process flow for a feature space data generating system using a feature space neural network.
Figure 4:
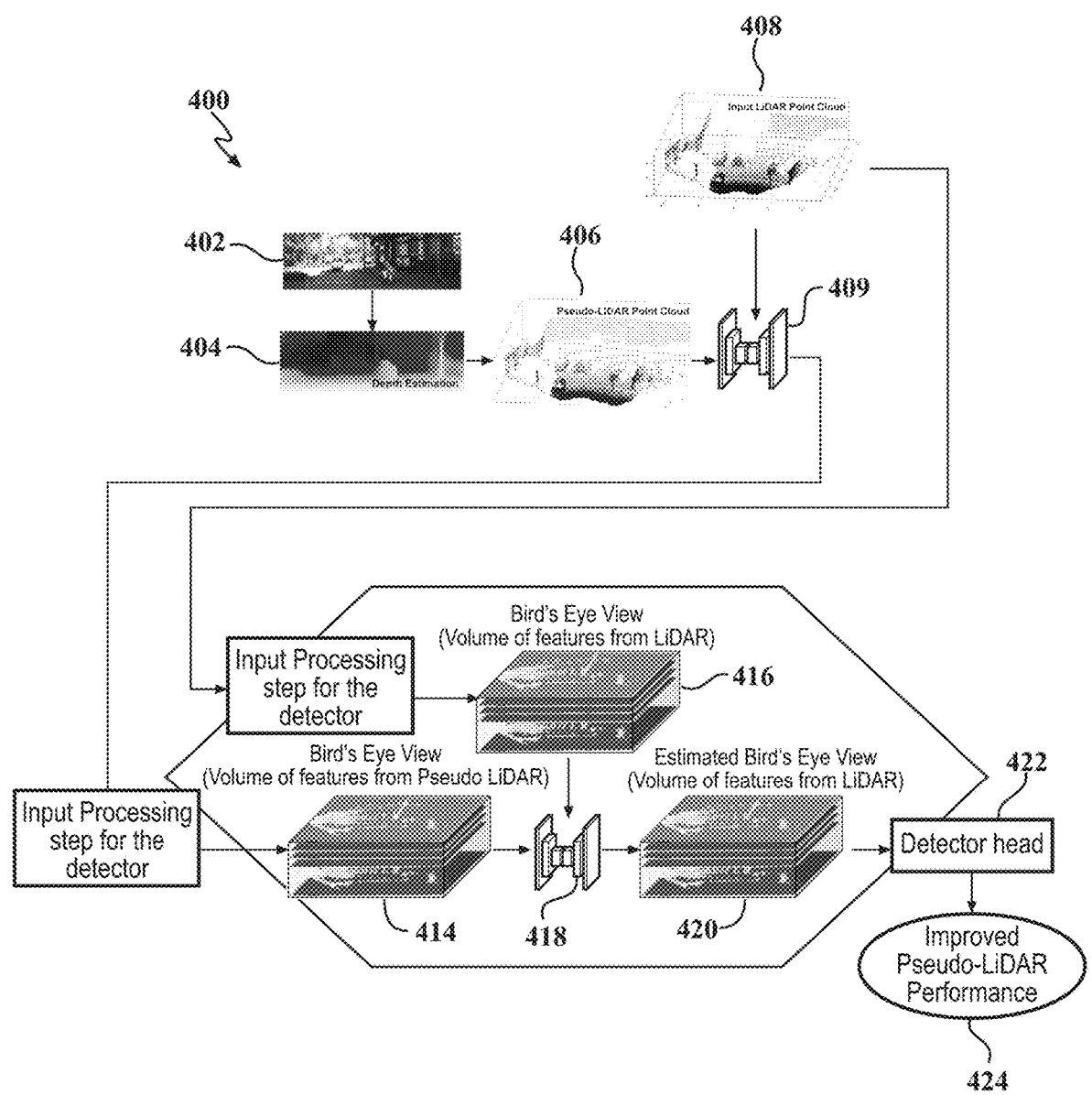
FIG. 4 illustrates another example of a process flow for a feature space data generating system using a feature space neural network and a pseudo-LIDAR neural network.
Figure 5:
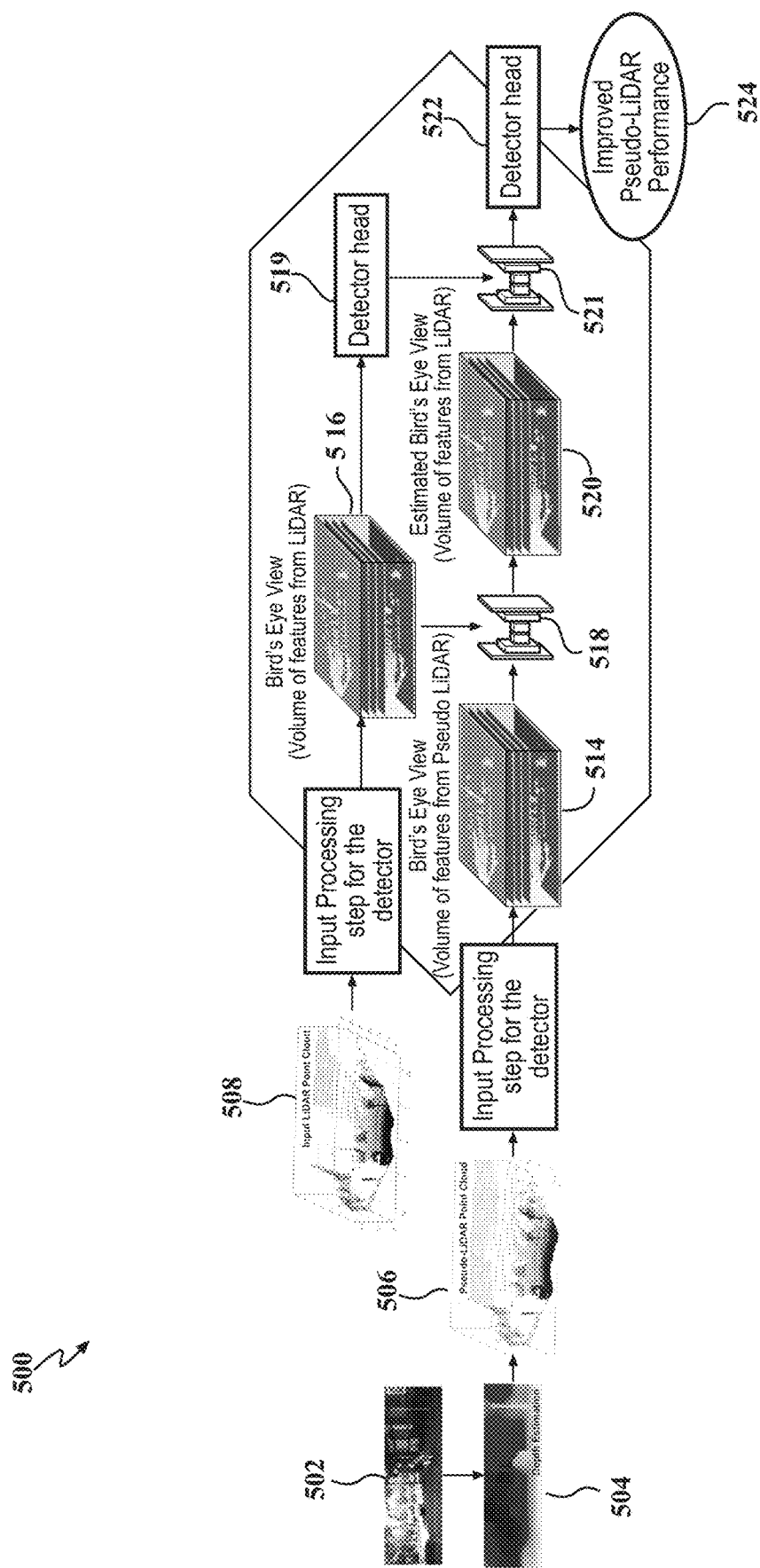
FIG. 5 illustrates another example of a process flow for a feature space data generating system using a feature space neural network and a detector tuning neural network.

With regard to the modules 220-226, reference will be made to FIGS. 2 and 3. As stated previously, FIG. 2 illustrates a more detailed view of the feature space generating system 170. FIG. 3 illustrates a flow process 300 that illustrates a flow of information from the initial input provided to the feature space generating system 170 to output generated by the feature space generating system 170. Additionally, as will be explained in the following paragraphs, reference will also be made to FIGS. 4 and 5 that show different variations 400 and 500, respectively, of the flow process 300 shown in FIG. 3. With regards to reference numerals, the reference numerals utilized in FIGS. 4 and 5 substantially match the reference numerals utilized in FIG. 3, with the exception that the reference numerals have been incremented by 100. As such, the two-dimensional image(s) 302 of FIG. 3 corresponds to the two-dimensional image 402 of FIG. 4, as well as the two-dimensional image 502 of FIG. 5. In situations where like reference numerals are utilized, unless specifically stated otherwise, the previously given description should be utilized. As such, for example, the description regarding the two-dimensional image(s) 302 is equally applicable to the two-dimensional images 402 and 502 of FIGS. 4 and 5, respectively.

The input module 220 configures the processor(s) 110 to obtain or receive information from one or more sensors, such as the camera 126. The information may be in the form of one or more two-dimensional image(s) 302 and may be stored in the data store 240 as the sensor data 250. In the case a two-dimensional images, the two-dimensional image is, for example, an image from the camera 126 that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (i.e., the direction of travel) 60, 90, 120-degree field-of-view (FOV), a rear/side facing FOV, or some other subregion as defined by the characteristics of the camera 126. In further aspects, the camera 126 may be an array of two or more cameras that capture multiple images of the surrounding environment and stitch the images together to form a comprehensive 360-degree view of the surrounding environment. In other examples, the one or more images may be paired stereoscopic images captured from the camera 126 having stereoscopic capabilities.

In either case, the two-dimensional image(s) 302 may include visual data of the FOV that is encoded according to an image standard (e.g., codec) associated with the camera 126. In general, characteristics of the camera 126 and the image standard define a format of the image. Thus, while the particular characteristics can vary according to different implementations, in general, the image has a defined resolution (i.e., height and width in pixels) and format. Thus, for example, the image is generally an RGB visible light image. In further aspects, the two-dimensional image(s) 302 can be one or more infrared images associated with a corresponding infrared camera, a black/white image, or another suitable format as may be desired.

The depth map generating module 221 causes the processor(s) 110 to receive the two-dimensional images from the camera 126 and generate a depth map 304. Moreover, the two-dimensional image may implicitly provide depth information in the relationships of perspective and size of elements depicted in the image from which the depth map generating module 221 derives a depth map 304 by using the depth model. The depth map 304 is, in one embodiment, a data structure corresponding to the image that indicates distances/depths to objects/features represented therein. It should be appreciated that the depth map generating module 221 may be a machine learning algorithm/model that may be broadly characterized as a CNN or as an encoder/decoder architecture including convolutional components.

The two-dimensional image(s) 302 is provided as an input into the depth map generating module 221, which may include an encoder that accepts the image as an electronic input and processes the image to extract features from the image. The features are, in general, aspects of the image that are indicative of spatial information that is intrinsically encoded therein. As such, encoding layers that form the encoder function to fold (i.e., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original monocular image. The depth maps 304 generated by the processor(s) 110 may then be stored on the on the data store 240 as depth map data 251.

Other methodologies for generating the depth map may also be utilized. For example, U.S. Pat. App. Pub. 2020/0090359A1 entitled "Systems and Methods for Depth Estimation Using Monocular Images" to Pillai et al., which is hereby incorporated by reference in its entirety, discloses a system and method determining the depth of a scene from a monocular image, and, more particularly, to using a self-supervised approach to depth estimation that includes using a differentiable flip-augmentation layer to improve estimates.

Additionally, stated previously, the two-dimensional image(s) 302 may be stereoscopic paired images generated by the camera 126. In this case, the two-dimensional image(s) 302 being stereoscopic pair can be utilized to derive depth information by performing comparison between the two stereoscopic images. Furthermore, other information such as the rigid body transform between the stereoscopic cameras forming the camera 126 may be utilized to further define the depth of objects captured in the two-dimensional image(s) 302. This information can then be utilized to generate the depth map 304 by the depth map generating module 221.

The pseudo-LIDAR generating module 222 may cause the processor(s) 110 to then generate a pseudo-LIDAR point cloud 306 based on the depth map 304 outputted by the depth map generating module 221. Moreover, the pseudo-LIDAR generating module 222 may cause the processor(s) 110 by taking the depth map and back projecting the depth map into a 3D point cloud. This pseudo-LIDAR point cloud 306 essentially mimics an actual point cloud generated by an actual LIDAR sensor. The pseudo-LIDAR point clouds 306 generated by the processor(s) 110 may then be stored on the on the data store 240 as pseudo-LIDAR data 252.

The pseudo-LIDAR generating module 222 may utilize a trained neural network, such as a CNN or a GAN to tune the pseudo-LIDAR point cloud 306. For example, referring to FIG. 4, the flow process 400 includes a neural network 409. The neural network 409 has been trained utilizing an actual LIDAR point cloud, such as actual LIDAR point cloud 408 that was generated from an actual LIDAR sensor. In this example, the neural network 409 may be trained to generate better per-point features as precursors of a better pseudo-LIDAR Bird's Eye features.

The feature space generating module 223 includes instructions that when executed by the processor(s) 110 cause of the processors to generate a BEV feature space 314 based on the pseudo-LIDAR data 252 previously generated. The BEV feature space 314 generated by the feature space generating module 223 may be a BEV feature space, which essentially provides a two-dimensional BEV of the environment surrounding the vehicle 100.

The BEV feature space 314 is a representation information extracted from the pseudo-LIDAR data 252 or other 3D point cloud such as the generated by a LIDAR sensor. Moreover, the extracted features may be matched, reshaped, and mapped to elements of a data structure. The data structure, such as a vector, corresponds to a feature space of a 3D representation of a spatial environment. The 3D representation may be a 3D grid that is partitioned into multiple cells. The cells may be partitioned to have different sizes and/or orientations based on various factors. For example, the BEV feature space 314 may be generated by converting the pseudo-LIDAR data 252, which will be in the form of a point cloud, into a plurality of voxels. Based on the number of points located within each voxel, a value may be associated with the voxel.

In another example, such as described in U.S. Pat. App. Pub. No. 2019/0371052A1 entitled "Inferring Locations of 3D Objects in a Spatial Environment" to Kehl et al., the entirety of which is hereby incorporated by reference, the BEV feature space 314 may be a 3D grid that may represent an area that is in front of an agent, such as the vehicle 100. In this example, cells of the 3D grid may be uniformly partitioned into rows and columns of cells. As another example, cells of the 3D grid may be partitioned based on polar coordinates centered at the agent. Each cell layout of a 3D grid may be represented by parameters (e.g., elements) in a one-dimensional data structure, such as a vector. Accordingly, each 3D grid may be reconstructed based on the elements of a corresponding vector.

The elements of a vector may be processed to determine whether a cell contains features for object recognition. Empty cells may be ignored. Using a trained artificial neural network, features of the non-empty cells are analyzed to identify one or more of a class of an object, orientation of the object, and/or distance to the object. The generated BEV feature space 314 may be saved as feature space data 253 on the data store 240.

The modification module 224 may cause the processor(s) 110 to modify the BEV feature space 314 to generate improved BEV feature space 320. Moreover, the modification module 224 may utilize a feature space neural network 318 on the BEV feature space 314 to generate an improved BEV feature space 320. The feature space neural network 318 may be trained by using a training LIDAR feature space 316 based on a LIDAR point cloud 308 as a ground truth generated by a feature space generating module 223 which can use the same parameters or being a new module instance. The model weights of the trained neural network may be stored in the data store 240 as model weight(s) 254.

Moreover, by utilizing an actual LIDAR feature space 316 based on a LIDAR point cloud 308 as a ground truth, the modification module 224 using the feature space neural network 318 can perform modifications of the BEV feature space 314 to generate improved BEV feature space 320, that more closely mimics a feature space generated using actual LIDAR point cloud data captured from an actual LIDAR sensor, as opposed to pseudo-LIDAR point cloud data based on one or more two-dimensional images.

The convolutional neural network that forms the feature space neural network 318 may be one or more CNNs or GANs that have been trained using actual LIDAR feature space based on a LIDAR point cloud as a ground truth. The training may be supervised training, wherein the feature space neural network 318 is trained using the ground truth BEV feature space 316 as a reference point. As more and more training occurs, the feature space neural network 318 is able to modify the feature space data to generate feature spaces that more closely mimic feature spaces that originated with actual LIDAR point cloud data captured from an actual LIDAR sensor. The model weights of the trained neural network may be stored in the data store 240 as model weight(s) 254.

The detector tuning module 225 may cause the processor(s) 110 to further to the output generated by the modification module 224. Moreover, with reference to FIG. 5, the detector tuning module 225 may utilize a tuning neural network 521 that may be a CNN or a GAN. The tuning neural network 521 may be trained in a supervised fashion, wherein the output of a traditional LIDAR detection system 519 may be utilized to train the tuning neural network 521 to output data that more closely corresponds to the output of a tradition LIDAR detection system. The model weights of the trained neural network may be stored in the data store 240 as model weight(s) 254.

In one example, the purpose of this tuning performed by the detector tuning module 225 is to adapt the improved BEV feature space 320 so that the improved BEV feature space 320 can be inputted into an object detection system that is used to receiving BEV feature space information that was originally captured by much more complex and expensive LIDAR sensor.

The output module 226 contains instructions that cause the processor(s) 110 to output the improved BEV feature space 320. The output module 226 may perform this through detector head 322, which outputs the improved feature space data 324, which results in improved pseudo-LIDAR performance.

As such, by utilizing one or more neural networks to improve the BEV feature space data by using a trained neural network that has been trained utilizing feature space data generated from an actual LIDAR point cloud generated by an actual LIDAR sensor, the feature space generating system 170 can output BEV feature space data that is comparable to BEV feature space data of the ground truth. This is the advantage in that less expensive and less complex sensors, such as the camera 126 may be utilized, as opposed to more expensive and more complex LIDAR sensors.

Figure 6:
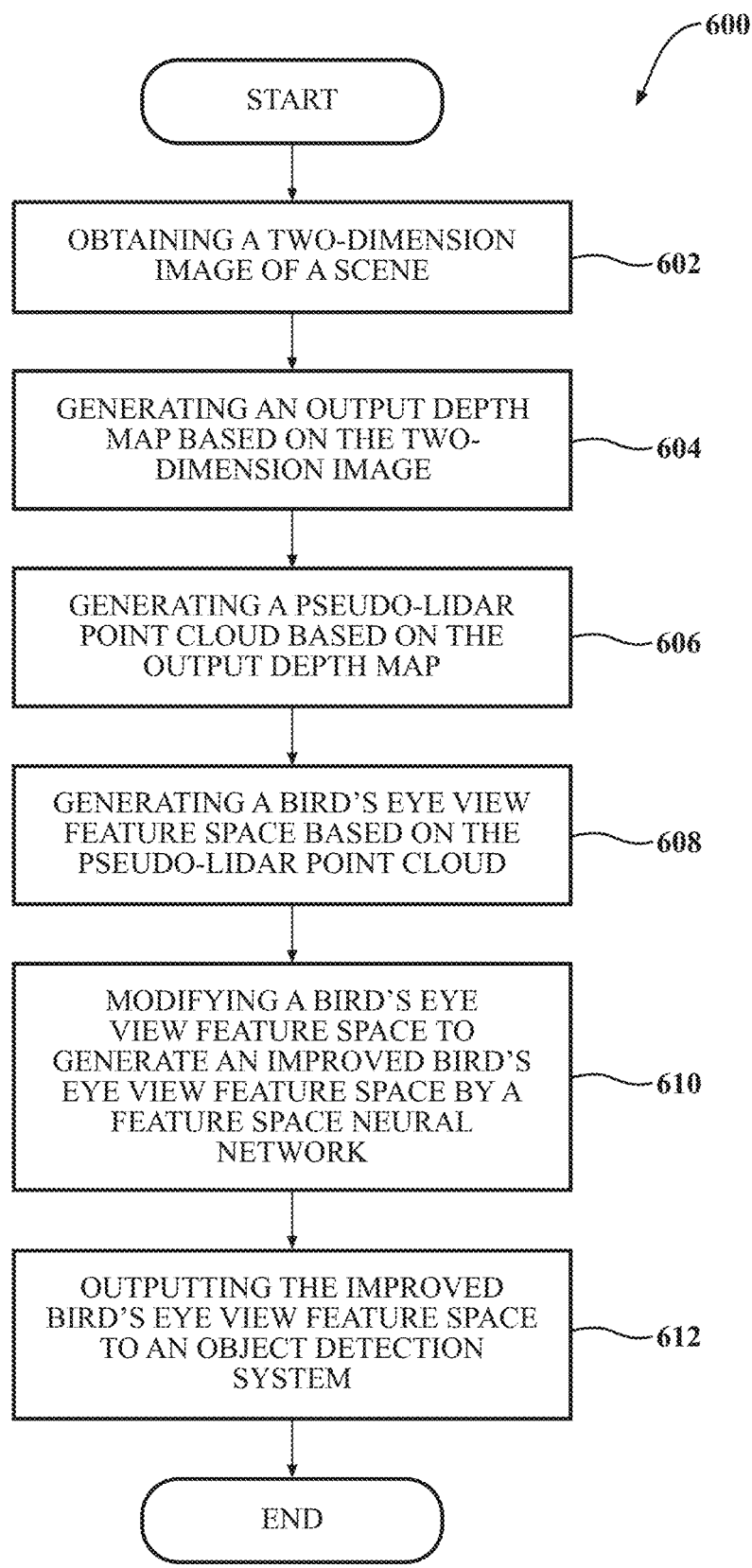
FIG. 6 illustrates a method for generating feature space data using one or more two-dimensional images.

Additional aspects of generating improved feature space data based on one or more two-dimensional images will be discussed in relation to FIG. 6. FIG. 6 illustrates a method 600 for generating improved feature space data. Method 600 will be discussed from the perspective of the feature space generating system 170 of FIGS. 1-3. While method 600 is discussed in combination with the feature space generating system 170, it should be appreciated that the method 600 is not limited to being implemented within the feature space generating system 170 but is instead one example of a system that may implement the method 600.

In step 602, the input module 220 configures the processor(s) 110 to obtain or receive information from one or more sensors, such as the camera 126. The information may be in the form of one or more two-dimensional image(s) 302 and may be stored in the data store 240 as the sensor data 250. As such, the sensor data 250 may include data captured by one or more sensors, such as two-dimensional image(s) 302 captured from the camera 126. The sensor data 250 may be in the form of two-dimensional images—either individual or paired stereoscopic images. As described earlier, in the case a two-dimensional images, the two-dimensional image is, for example, an image from the camera 126 that encompasses a field-of-view about the vehicle 100 of at least a portion of the surrounding environment, sometimes referred to as a scene.

In step 604, the depth map generating module 221 causes the processor(s) 110 to receive the two-dimensional images from the camera 126 and generate a depth map 304. Moreover, the two-dimensional image implicitly provides depth information in the relationships of perspective and size of elements depicted in the image from which the depth map generating module 221 derives a depth map 304 by using the depth model. The depth map 304 is, in one embodiment, a data structure corresponding to the image that indicates distances/depths to objects/features represented therein.

In step 606, the pseudo-LIDAR generating module 222 may cause the processor(s) 110 to then generate a pseudo-LIDAR point cloud 306 based on the depth map 304 outputted by the depth map generating module 221. Moreover, the pseudo-LIDAR generating module 222 may cause the processor(s) 110 by taking the depth map and back projecting the depth map into a 3D point cloud. This pseudo-LIDAR point cloud 306 essentially mimics an actual point cloud generated by an actual LIDAR sensor. The pseudo-LIDAR generating module 222 may utilize a trained neural network, such as a CNN or a GAN to tune the pseudo-LIDAR point cloud 306. The model weights of the trained neural network may be stored in the data store 240 as model weight(s) 254.

In step 608, as explained previously, the feature space generating module 223 includes instructions that when executed by the processor(s) 110 cause of the processors to generate a BEV feature space 314 based on the pseudo-LIDAR data 252 present generated. The BEV feature space 314 generated by the feature space generating module 223 may be a BEV feature space, which essentially provides a two-dimensional BEV of the environment surrounding the vehicle 100.

In step 610, the modification module 224 may cause the processor(s) 110 to modify the BEV feature space 314 to generate an improved BEV feature space 320. Moreover, the modification module 224 may utilize a feature space neural network 318 on the BEV feature space 314 to generate an improved BEV feature space 320. The feature space neural network 318 may be trained by using a training LIDAR feature space 316 based on a LIDAR point cloud 308 as a ground truth. Moreover, by utilizing an actual LIDAR feature space 316 based on a LIDAR point cloud 308 as a ground truth, the modification module 224 using the feature space neural network 318 can perform modifications of the BEV feature space 314 to generate improved BEV feature space 320, that more closely mimics a feature space generated using actual LIDAR point cloud data captured from an actual LIDAR sensor, as opposed to pseudo-LIDAR point cloud data based on one or more two-dimensional images.

In step 612, output module 226 contains instructions that cause the processor(s) 110 to output the improved BEV feature space 320. The output module 226 may perform this through detector had 322 which outputs the improved feature space data 324, which results in improved pseudo-LIDAR performance.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known, or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processor(s) 110. In one or more arrangements, the processor(s) 110 can be a main processor of the vehicle 100. For instance, the processor(s) 110 can be an electronic control unit (ECU). The vehicle 100 can include one or more data store(s) 115 for storing one or more types of data. The data store(s) 115 can include volatile and/or non-volatile memory. Examples of data store(s) 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 115 can be a component of the processor(s) 110, or the data store(s) 115 can be operatively connected to the processor(s) 110 for use thereby. The term "operatively connected," as used throughout this description, can include direct or indirect connections, including connections without direct physical contact.

In one or more arrangements, the one or more data store(s) 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain map(s) 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle map(s) 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data store(s) 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data store(s) 115 located onboard the vehicle 100. Alternatively, or in addition, at least a portion of the map data 116 and/or the sensor data 119 can be located in one or more data store(s) 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensor(s) 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMUS), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensor(s) 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the feature space generating system 170, and/or the autonomous driving module(s) 160 can be operatively connected to communicate with the vehicle systems 140 and/or individual components thereof. For example, returning to FIG. 1, the processor(s) 110 and/or the autonomous driving module(s) 160 can be in communication to send and/or receive information from the vehicle systems 140 to control the movement, speed, maneuvering, heading, direction, etc. of the vehicle 100. The processor(s) 110, the feature space generating system 170, and/or the autonomous driving module(s) 160 may control some or all of these vehicle systems 140 and, thus, may be partially or fully autonomous.

The processor(s) 110, the feature space generating system 170, and/or the autonomous driving module(s) 160 can be operatively connected to communicate with the vehicle systems 140 and/or individual components thereof. For example, returning to FIG. 1, the processor(s) 110, the feature space generating system 170, and/or the autonomous driving module(s) 160 can be in communication to send and/or receive information from the vehicle systems 140 to control the movement, speed, maneuvering, heading, direction, etc. of the vehicle 100. The processor(s) 110, the feature space generating system 170, and/or the autonomous driving module(s) 160 may control some or all of these vehicle systems 140.

The processor(s) 110, the feature space generating system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the feature space generating system 170, and/or the autonomous driving module(s) 160 can control the direction and/or speed of the vehicle 100. The processor(s) 110, the feature space generating system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor(s) 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store(s) 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving module(s) 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the feature space generating system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver," means one or more actions that affect the movement of a vehicle. Examples of driving maneuvers include accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in the figures, but the embodiments are not limited to the illustrated structure or application.

The flowcharts and block diagrams in the FIGS. illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for generating feature space data, the system comprising:
   one or more processors; and
   a memory in communication with the one or more processors, the memory having:
      an input module having instructions that, when executed by the one or more processors, causes the one or more processors to obtain a two-dimension image of a scene,
      a depth map generating module having instructions that, when executed by the one or more processors, causes the one or more processors to generate an output depth map based on the two-dimension image of the scene,
      a pseudo-light detection and ranging (LIDAR) generating module having instructions that, when executed by the one or more processors, causes the one or more processors to generate a pseudo-LIDAR point cloud based on the output depth map,
      a feature space generating module having instructions that, when executed by the one or more processors, causes the one or more processors to generate a pseudo-LIDAR bird's eye view feature space based on the pseudo-LIDAR point cloud, the bird's eye view feature space being a bird's eye view of the scene and having on more features, and
      a modification module having instructions that, when executed by the one or more processors, causes the one or more processors to modify, by using a feature space neural network, the pseudo-LIDAR bird's eye view feature space to generate an improved pseudo-LIDAR bird's eye view feature space, wherein the feature space neural network was trained by using a training LIDAR feature space based on a LIDAR point cloud as a ground truth.

2. The system of claim 1, wherein the feature space neural network is at least one of a convolutional neural network and a generative adversarial network.

3. The system of claim 1, wherein the pseudo-LIDAR generating module further includes instructions that, when executed by the one or more processors, causes the one or more processors to generate the pseudo-LIDAR point cloud using a pseudo-LIDAR neural network, wherein the pseudo-LIDAR neural network was trained by using the LIDAR point cloud as a ground truth.

4. The system of claim 1, wherein the memory further comprises a detector tuning module, the detector tuning module having instructions that, when executed by the one or more processors, causes the one or more processors to tune the improved pseudo-LIDAR bird's eye view feature space by a detector tuning neural network, wherein the detector tuning neural network was trained by using a training LIDAR feature space as a ground truth generated from the LIDAR point cloud.

5. The system of claim 1, wherein the feature space generating module further includes instructions that, when executed by the one or more processors, causes the one or more processors to:
   divide the pseudo-LIDAR point cloud into a plurality of voxels, and
   assign an at least one value based on one or more points located within the voxel.

6. The system of claim 1, wherein the pseudo-LIDAR generating module further includes instructions that, when executed by the one or more processors, causes the one or more processors to:
   tune a neural network for the pseudo-LIDAR generating module to generate better intermediate features that contribute to a better pseudo LIDAR bird's eye view feature space.

7. The system of claim 1, wherein the memory further comprises an output module having instructions that, when executed by the one or more processors, cause the one or more processors to output the improved pseudo-LIDAR bird's eye view feature space to an object detection system that detects objects in the scene based on the improved pseudo-LIDAR bird's eye view feature space.

8. A method for generating feature space data, the method comprising the steps of:
   obtaining a two-dimension image of a scene;
   generating an output depth map based on the two-dimension image of the scene;
   generating a pseudo-light detection and ranging (LIDAR) point cloud based on the output depth map;
   generating a pseudo-LIDAR bird's eye view feature space based on the pseudo-LIDAR point cloud, the bird's eye view feature space being a bird's eye view of the scene and having on more features; and
   modifying, by a feature space neural network, the pseudo-LIDAR bird's eye view feature space to generate an improved pseudo-LIDAR bird's eye view feature space, wherein the feature space neural network was trained by using a training LIDAR feature space based on a LIDAR point cloud as a ground truth.

9. The method of claim 8, wherein the feature space neural network is at least one of a convolutional neural network and a generative adversarial network.

10. The method of claim 8, wherein the step of generating the pseudo-LIDAR point cloud is performed by a pseudo-LIDAR neural network, wherein the pseudo-LIDAR neural network was trained by using a training LIDAR point cloud as a ground truth.

11. The method of claim 8, further comprising the step of tuning the improved pseudo-LIDAR bird's eye view feature space by a detector neural network, wherein the detector neural network was trained by using a training LIDAR feature space as a ground truth generated from a LIDAR point cloud.

12. The method of claim 8, wherein the step of generating a pseudo-LIDAR bird's eye view feature space comprises the step of:
   dividing the pseudo-LIDAR point cloud into a plurality of voxels; and
   assigning an at least feature vector based on one or more points located within the voxel.

13. The method of claim 8, further comprising the step of tuning a neural network that generates the pseudo-LIDAR point cloud to generate better intermediate features that contribute to a better pseudo LIDAR bird's eye view feature space.

14. The method of claim 8, further comprising the step of outputting the improved pseudo-LIDAR bird's eye view feature space to an object detection system that detects objects in the scene based on the improved pseudo-LIDAR bird's eye view feature space.

15. A non-transitory computer-readable medium storing instructions for generating feature space data that, when executed by one or more processors, cause the one or more processors to:
   obtain a two-dimension image of a scene;
   generate an output depth map based on the two-dimension image of the scene;
   generate a pseudo-light detection and ranging (LIDAR) point cloud based on the output depth map;
   generate a pseudo-LIDAR bird's eye view feature space based on the pseudo-LIDAR point cloud, the pseudo-LIDAR bird's eye view feature space being a bird's eye view of the scene and having on more features; and
   modify, by a feature space neural network, the pseudo-LIDAR bird's eye view feature space to generate an improved pseudo-LIDAR bird's eye view feature space, wherein the feature space neural network was trained by using a training LIDAR feature space as a ground truth based on a LIDAR point cloud.

16. The non-transitory computer-readable medium of claim 15, further storing instructions that, when executed by one or more processors, cause the one or more processors to generate the pseudo-LIDAR point cloud by using a pseudo-LIDAR neural network, wherein the pseudo-LIDAR neural network was trained by using a LIDAR point cloud as a ground truth.

17. The non-transitory computer-readable medium of claim 15, further storing instructions that, when executed by one or more processors, cause the one or more processors to tune the improved pseudo-LIDAR bird's eye view feature space by a detector neural network, wherein the detector neural network was trained by using a training LIDAR feature space as a ground truth generated from the LIDAR point cloud.

18. The non-transitory computer-readable medium of claim 15, further storing instructions that, when executed by one or more processors, cause the one or more processors to:
   divide the pseudo-LIDAR point cloud into a plurality of voxels; and
   assign an at least one value based on one or more points located within the voxel.

19. The non-transitory computer-readable medium of claim 15, further storing instructions that, when executed by one or more processors, cause the one or more processors to tune the pseudo-LIDAR point cloud by a LIDAR tuning neural network, wherein the LIDAR tuning neural network was trained by using the LIDAR point cloud as a ground truth.

20. The non-transitory computer-readable medium of claim 15, further storing instructions that, when executed by one or more processors, cause the one or more processors to output the improved pseudo-LIDAR bird's eye view feature space to an object detection system that detects objects in the scene based on the improved pseudo-LIDAR bird's eye view feature space.

* * * * *